United States Patent [19]

Toratani

[11] 4,079,428
[45] Mar. 14, 1978

[54] TRACK CHANGING MECHANISM FOR CARTRIDGE TYPE TAPE PLAYERS

[75] Inventor: Takehiko Toratani, Iwaki, Japan

[73] Assignee: Alps Motorola, Inc., Tokyo, Japan

[21] Appl. No.: 702,820

[22] Filed: Jul. 6, 1976

Related U.S. Application Data

[63] Continuation of Ser. No. 544,507, Jan. 27, 1975, abandoned.

[30] Foreign Application Priority Data

Feb. 28, 1974 Japan .................................. 49-23842

[51] Int. Cl.² .............................................. G11B 5/54
[52] U.S. Cl. ..................................... 360/106; 360/78
[58] Field of Search .................... 360/106, 109, 78, 76

[56] References Cited

U.S. PATENT DOCUMENTS

| | | | |
|---|---|---|---|
| 2,864,892 | 12/1958 | Perkins | 360/109 |
| 3,372,937 | 3/1968 | Flint | 360/106 |
| 3,477,725 | 11/1969 | Housman | 360/106 |
| 3,882,543 | 5/1975 | Richards | 360/109 |
| 3,925,819 | 12/1975 | Bachmann | 360/106 |

*Primary Examiner*—John H. Wolff
*Attorney, Agent, or Firm*—James W. Gillman; Donald J. Lisa

[57] ABSTRACT

A track changing mechanism for a cartridge-type tape player produces accurate vertical movement of the magnetic head under control of a stepped cam member by providing a holding member attached to the tape player chassis and extending vertically from it. A slidable plate is slidably engaged with the holding member and has a cam follower attached to it for adjusting the vertical position of the slidable plate in accordance with the rotational position of the cam member. The slidable plate also has a pair of projections extending from it, and the head of the player is mounted on a head mounting plate which is attached to the slidable plate. The head mounting plate includes a pair of notches in it for engagement with the projections to permit azimuth adjustments of the magnetic head.

10 Claims, 4 Drawing Figures

TRACK CHANGING MECHANISM FOR CARTRIDGE TYPE TAPE PLAYERS

This is a continuation, of application Ser. No. 544,507, filed Jan. 27, 1975 now abandoned.

BACKGROUND OF THE INVENTION

This invention relates to cartridge-type tape players (or tape recorders), and more particularly to a track changing mechanism for an 8-track cartridge-type tape player.

Often magnetic cartridge tape players (or recorders) of this type are installed in the dashboard or in the neighborhood of the dashboard of an automobile or automotive vehicle. As a consequence, it is essential that such players be compact in size and provide reliable operation under the conditions to which the player is subjected in the normal operation of the automobile.

Generally, the track changing mechanisms for an 8-track cartridge-type tape player employ a pantograph assembly or the like to provide for vertical movement of a magnetic tape head carried by the pantograph to locate the head at different vertical positions relative to the tape in the cartridge for changing the tracks to be played. This type of an assembly, however, includes a number of parts and may be subject to mis-alignment in the normal operation of the vehicle in which such a player is used.

Therefore, it is desirable to provide a track changing mechanism for a multi-track cartridge-type tape player which is of relatively small size and simple construction and which is reliable in operation.

SUMMARY OF THE INVENTION

It is an object of this invention to provide an improved magnetic tape player.

It is another object of this invention to provide an improved track changing mechanism for a cartridge-type magnetic tape player.

It is a further object of this invention to provide a simple track changing mechanism for a tape player.

It is s further object of this invention to provide a simplified track changing mechanism for moving the head of a magnetic tape player in a fixed plane.

In accordance with a preferred embodiment of this invention, a cartridge-type type player includes a chassis having a vertically extending holding member attached to it for slidably engaging a slidable plate to guide movement of the slidable plate in an established plane. A stepped cam member also is mounted on the chassis, and a cam follower is attached to the slidable plate for adjusting the vertical position of the slidable plate in accordance with the rotational position of the stepped cam member. The slidable plate includes members on it for cooperatively engaging corresponding portions of a head mounting plate which is attached to the slidable plate. The cooperatively engaged portions of the slidable plate and the head mounting plate permit a limited amount of azimuth adjustment of the head, while the vertical holding member insures that the head is moved vertically to position it to change the tracks which are reproduced in a cartridge being played by the player.

The nature, principal and utility of the present invention will be better understood from the following detailed description when read in conjunction with the accompanying drawings wherein like parts are designated by like reference numerals in the several figures.

DETAILED DESCRIPTION OF THE INVENTION

Figure 1:
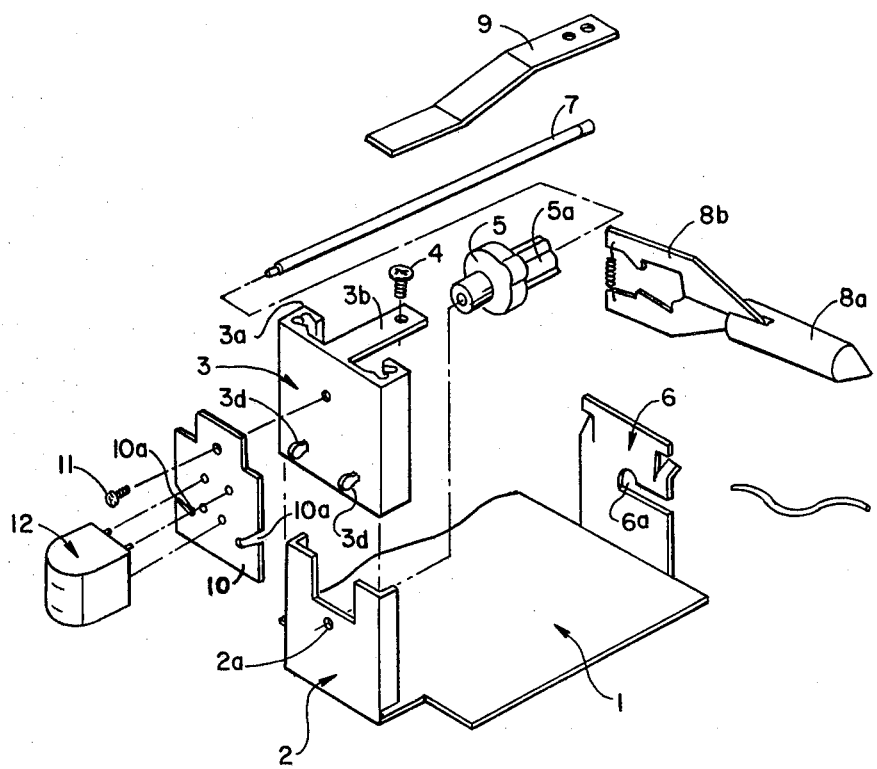
FIG. 1 is an exploded perspective view of a preferred embodiment of the invention.
Figure 2:
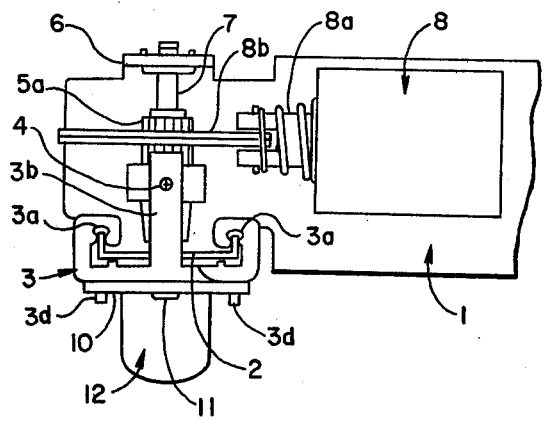
FIG. 2 is a plan view of the same embodiment of the invention.
Figure 3:
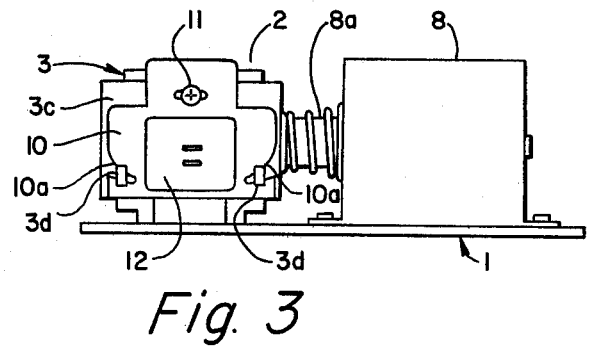
FIG. 3 is a front elevational view of the same embodiment of the invention.

Referring now to FIGS. 1, 2 and 3, showing a preferred embodiment of the present invention, there is provided a chassis 1 from which a vertical holding member 2 is integrally formed. A slidable plate 3, made of a synthetic resin or the like and having engaging ribs 3a and 3a, is brought into vertical sliding engagement with the holding member 2 of the chassis 1. The slidable plate 3 also has an arm 3b extending rearwardly from an upper middle portion thereof, as viewed in FIG. 1 and a cam-follower screw 4 is threaded through the rear end portion of the arm 3b for cooperating with a stepped cam member 5 provided with steps on the circumferential cam surface.

A ratchet wheel 5a is integrally connected to the stepped cam member 5, and this integral body has a central hole through which a shaft 7 is extended in a freely rotatable manner. The front end of the shaft 7 is inserted into a hole 2a in the holding member 2, and the rear end of the shaft 7 is inserted into a slot 6a provided in another vertical portion 6 of the chassis 1, so that the shaft 7, rotatably mounting the integral body of the cam member, is supported by the holding member 2 and the portion 6 of the chassis 1. A conventional solenoid 8 shown in FIGS. 2 and 3 includes an armature 8a, to an end of which is attached a ratchet pawl 8b which engages the ratchet wheel 5a integrally connected to the stepped cam member 5.

A planar spring 9 is attached to, for instance, the upper part of the portion 6 in a manner not shown in detail to resiliently depress the slidable plate 3 downwardly, so that the lower end of the screw 4 is always urged against the cam surface of the stepped cam member 5. In addition, a plate 10 for securely mounting a magnetic head 12 is provided, and a pair of arcuate notches 10a, 10a are formed at both sides of the plate 10. A pair of projections 3d, 3d extend from the surface 3c of the slidable plate 3, and the pair of projections 3d, 3d are engaged into the notches 10a, 10a in the plate 10 to permit the plate 10 to be rotated along the surface 3c of the plate 3 in a limited angular range to adjust the azimuth of the head 12. Once this has been done, the plate 10 is secured to the surface 3c by tightening a screw 11 which is threaded into a hole 3e in the slidable plate 3.

In the operation of the track changing mechanism, an electrically conductive foil provided at an end of the magnetic tape of a standard cartridge is detected by a contact switch (not shown) whereupon the solenoid 8 is energized to retract the armature 8a. The retraction of the armature 8a causes the stepped cam member 5 to rotate through the action of the pawl 8b engaging the ratchet wheel 5a in a conventional manner. The rotation of the cam member 5 causes the screw 4, which is urged by the planar spring 9 to contact the cam surface, to be raised or lowered in accordance with the configuration of the cam surface. This in turn moves the slidable plate 3 along the holding member 2 upward or downward accordingly, and the magnetic head 12 is moved to sense another track.

Figure 4:
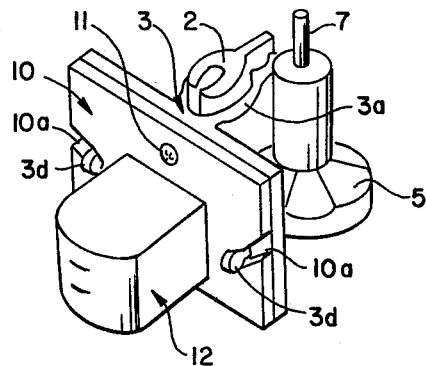
FIG. 4 is a perspective view of another embodiment of the present invention.

In FIG. 4, there is indicated another embodiment of the invention, wherein like parts are designated by like reference numerals, and the operation thereof is also similar to those described for the first embodiment of the invention.

In FIG. 4 the holding member has been changed in configuration from the generally C-shaped plate of FIG. 1 to a single, centrally located member 2 which extends vertically from the surface of the chassis 1 and is attached securely to the chassis 1. Because of this change in the configuration of the holding member 2, the engaging ribs 3a also are changed and are located generally centrally of the slidable plate 3 on each side of the vertical member 2 to slidably engage the member 2. The relative movement of the slidable plate 3 with respect to the member 2 of the embodiment shown in FIG. 4 is the same as in the embodiment previously described in conjunction with FIGS. 1, 2 and 3.

In FIG. 4 another modification is illustrated with respect to the configuration of the stepped cam member 5 and the shaft 7. The cam member 5 and the shaft 7 are shown in FIG. 4 as being rotatable about an axis extending vertically from the surface of the chassis 1 instead of parallel to that surface as illustrated in FIGS. 1, 2 and 3. Accordingly, a change in the configuration of the arm 3b is necessary to locate it so that the screw 4 can follow the surface variations on the upper surface of the cam 5 in a manner similar to the manner of the cam-follower arrangement discussed above in conjunction with FIGS. 1, 2 and 3. In all other respects the embodiment of FIG. 4 operates in the same way as the embodiment described in FIGS. 1, 2 and 3.

As is apparent from the above descriptions, the only movable parts for displacing the magnetic head to different track are the slidable plate 3 and the associated parts engaging the holding member 2. In addition, since the magnetic head 12 is attached to the surface 3c of the slidable plate 3 vertical to the chassis 1, the construction is simpler than the conventional construction where the magnetic head is supported by an arm extending from the chassis. The space saved by this improved construction can be utilized for encasing other components. Thus, the size of the entire tape player can be reduced, and since the magnetic head 12 is moved vertically to the chassis, the abutment of the magnetic head 12 to the magnetic tape in the cartridge is uniform.

Furthermore, the azimuth adjustment of the magnetic head 12 can be simply made during assembly, merely by rotating the plate 10 relative to the slidable plate 3 and tightening the screw 11. Thus, by inserting the slidable plate 3 into the holding member 2 of the chassis while these are on a production line the azimuth adjustment can be completed and the assembling of the entire tape player is thereby simplified.

Although the present invention has been described with reference to preferred embodiments thereof, it will be apparent to those skilled in the art that various modifications and alterations can be carried out without departing the scope of the present invention.

I claim:

1. In a magnetic tape player including a chassis, a track changing mechanism for moving a magnetic head to a plurality of different positions including a stepped cam member mounted on the chassis and means for rotating the stepped cam member to present different cam surfaces thereon to a predetermined position, the track changing mechanism including in combination:
   a holding member attached to said chassis and rising upwardly therefrom;
   a slidable plate slidably engaging said holding member for movement on said holding member in substantially upward and downward predetermined directions;
   means for mounting a magnetic head on said slidable plate; and
   cam-follower means attached to said slidable plate by means of a projection extending in a first direction perpendicular to said predetermined direction, said cam-follower means located for matingly engaging with said cam member and causing said slidable plate to move in said predetermined directions in accordance with the rotational position of said stepped cam member, and wherein said head mounting means includes a head mounting plate for rigidly mounting a magnetic head thereon, said head mounting plate being rotatably mounted on said slidable plate and permitting relative rotational orientation adjustments of said head mounting plate with respect to said slidable plate about an axis which is perpendicular to said predetermined directions.

2. The combination according to claim 1 wherein said holding member rises vertically from the chassis of a tape player and wherein said slidable plate includes guide means thereon for matingly engaging said holding member in a slidable relationship.

3. The combination according to claim 1 further including spring means for resiliently urging said cam-follower means into engagement with the surface of said stepped cam member.

4. The combination according to claim 1 wherein said head mounting means provides for mounting said magnetic head such that the head generally extends outward in a second direction perpendicular to said predetermined directions and in a substantially different direction from said first direction.

5. The combination according to claim 4 wherein said head mounting means includes at least one projection extending from the surface of one of said slidable and head mounting plates and the other of said slidable and head mounting plates has a mating notch formed therein for permitting a predetermined maximum amount of relative rotational movement, in a first rotary direction, between said head mounting plate and said slidable plate for making said rotational orientation adjustment.

6. The combination according to claim 5 wherein a pair of projections extend from the surface of said slidable plate and a pair of corresponding mating notches are formed in said head mounting plate; so that with the head mounting plate mounted on the slidable plate, the projections on the slidable late are engaged by the notches in the head mounting plate to permit maximum amounts of relative rotational movements between said head mounting plate and said slidable plate in both said first rotary direction and an opposite rotary direction.

7. In a magnetic tape player including a chassis, a track changing mechanism for moving a magnetic head to a plurality of different positions including a stepped cam member mounted on the chassis and means for rotating the stepped cam member to present different cam surfaces thereon to a predetermined position, the track changing mechanism including in combination:

a holding member attached to said chassis and rising upwardly therefrom;

a slidable plate slidably engaging said holding member for movement on said holding member in substantially upward and downward predetermined directions;

means for mounting a magnetic head on said slidable plate; and cam-follower means attached to said slidable plate and for matingly engaging with said cam member and causing said slidable plate to move in said predetermined directions in accordance with the rotational position of said stepped cam member;

said head mounting means including a head mounting plate for rigidly mounting a magnetic head thereon, said head mounting plate being rotatably mounted on said slidable plate and permitting relative rotational orientation adjustments of said head mounting plate with respect to said slidable plate about an axis which is perpendicular to said predetermined directions.

8. The combination according to claim 7 wherein said holding member rises vertically from the chassis of said tape player and wherein said slidable plate is generally C shaped and includes guide means thereon for matingly engaging said holding member in a slidable relationship.

9. A magnetic tape player including in combination:
a chassis;
and a track changing mechanism for moving a magnetic head to a plurality of different positions,
said track changing mechanism including in combination,
a stepped cam member rotatably mounted on the chassis,
means for rotating the stepped cam member to present different cam surfaces thereon to a predetermined position,
a holding member attached to said chassis and rising upwardly therefrom,
a slidable plate slidable engaging said holding member for movement on said holding member in substantially upward and downward predetermined directions,
means for mounting a magnetic head on said slidable plate, and
cam-follower means attached to said slidable plate by means of a projection extending in a first direction perpendicular to said predetermined directions, said cam-follower means located for matingly engaging with said cam member surfaces and causing said slidable plate to move in said predetermined directions in accordance with the rotational position of said stepped cam member, said cam member having a circumferential surface and said different cam surfaces being radial steps on the circumferential surface of said cam member, and said cam rotating means rotating said cam member about an axis perpendicular to said predetermine directions,
said head mounting means includes a head mounting plate for rigidly mounting a magnetic head thereon, said head mounting plate being rotatably mounted on said slidable plate and permitting relative rotational orientation adjustments of said head mounting plate with respect to said slidable plate about an axis which is perpendicular to said predetermined directions.

10. A magnetic tape player according to claim 9 wherein said cam rotating means includes a central axle for said cam member, said axle having at least one end supported by said holding member.

* * * * *